Oct. 3, 1967 R. E. BENNER 3,344,653
IMPACT TOOL TRIGGERING FORCE TESTER
Filed April 21, 1965
2 Sheets-Sheet 1
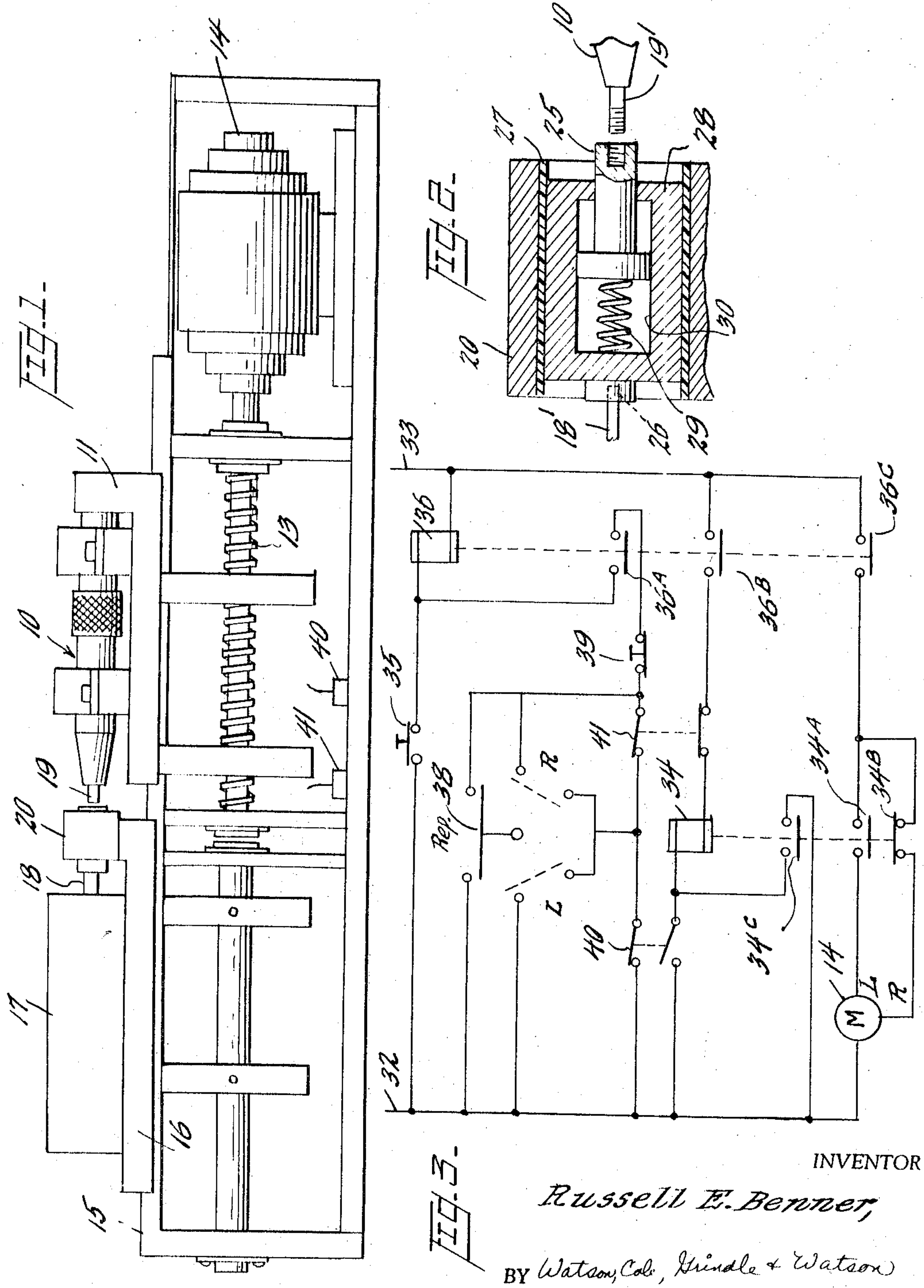
INVENTOR
Russell E. Benner,
BY Watson, Cole, Grindle & Watson
ATTORNEYS INVENTOR
Russell E. Benner,
BY Watson, Cole, Grindle & Watson
ATTORNEYS

United States Patent Office 3,344,653

Patented Oct. 3, 1967

1

3,344,653

IMPACT TOOL TRIGGERING FORCE TESTER

Russell E. Benner, Quakertown, Pa., assignor, by mesne assignments, to Valco Products Development, Inc., Bethlehem, Pa., a corporation of Pennsylvania Filed Apr. 21, 1965, Ser. No. 449,814

7 Claims. (Cl. 73—11)

ABSTRACT OF THE DISCLOSURE

This impact testing tool comprises a continuously movable mechanism for gradually increasing pressure on a work piece until a preset trigger value occurs at which the pressure is mutatively released. It includes special impact absorbing means for cancelling out the mutative trigger impact upon a gauge so that a maximum reading can be taken without distortion by the release of the trigger.

This invention relates to test equipment and more particularly it relates to test equipment for determining the release force of a triggered impact mechanism.

Impact tools are well known in the art which are provided with a trigger mechanism to release a hammer for impacting against a workpiece or for exerting work on a piece during a pull force until the pull reaches some preset maximum value. One such impact tool is described for example in U.S. Patent No. 3,181,626 issued to Ernst Sussman on May 4, 1964. The present invention is directed to a tester for determining the force required to release the impacting mechanism of such devices. It has previously been a problem to determine the release force for the impacting mechanism because of the fact that the triggered impact released at the instant of measurement was of sufficient force to disturb any measurement made upon the trigger or release force itself. Furthermore it is desirable to provide a simple testing device which could measure the release force of both an impact type triggered mechanism and a pull type triggered mechanism.

Thus it is a primary object of this invention to provide a tester for determining the actual force required to release the impacting mechanism of a triggered mechanism.

It is a further object of the invention to provide a tester which measured the release force of a triggered impacting mechanism or a triggered pull tool.

Another object of the invention is to provide a tester which desensitizes the triggered force components to permit direct measurement of the force at which the trigger mechanism releases.

In accordance with the invention therefore there is provided a power driven movable carriage and associated gauge so that the carriage may be moved to gradually force the triggering mechanism against the gauge to provide a maximum reading at the point of triggered release. In order to absorb the shock of the triggered force released in the tool of the type described, impact absorbing means is provided intermediate the tool and the gauge to permit the filtering out of the triggered force without disturbance of the maximum reading otherwise transmitted to the gauge. Thus a true reading of maximum force encountered immediately at the point of release of the trigger is provided by the test apparatus provided in accordance with this invention.

The above features and other particulars and advantages of the invention are described in the following specification with reference to the accompanying drawings, wherein:

FIGURE 1 is a side view of a test table afforded in accordance with this invention;

FIGURE 2 is a side view in section of an impact absorbing device used in accordance with the principles of this invention;

FIGURE 3 is a control circuit diagram illustrating an operable embodiment of this invention;

Figure 4:
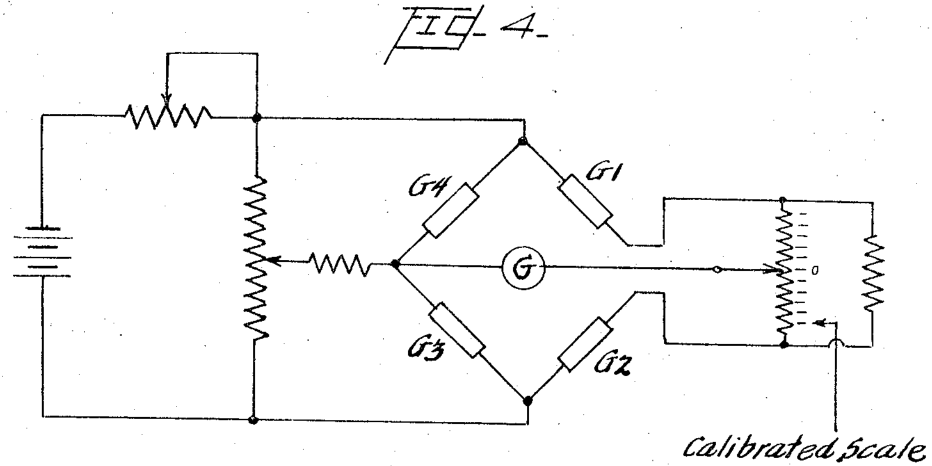
FIGURE 4 is a schematic circuit diagram of a Wheatstone bridge gauge circuit used in accordance with one aspect of this invention.

Now with reference to the embodiment of FIGURE 1 the impact tool 10 is clamped in the movable carriage 11 which is propelled by the motor driven screw mechanism 13. The motor 14 or similar power source is used to drive the screw 13 to advance the carriage 11 linearly either to the left or to the right as shown in the drawing.

Affixed to the frame 15 of the test device is a table 16 which may be mounted at an adjustable position for containing the load cell or gauge unit 17 which preferably retains the maximum reading. Extending from the load cell 17 is a shaft 18 to which force is applied. This shaft 18 is in alignment with the impact member 19 of the tool 10 and interspersed therebetween is an impact absorbing device 20.

In operation the nature of the impact tool 10 is to provide a mutative or impact force by way of the impact member 19 when the tool is pushed hard enough to release the trigger mechanism. Thus in order to determine the release force necessary for triggering the device, the motor 14 may turn the screw 13 and advance the impact mechanism 10 until it contacts the load cell shaft 18 by way of the interposed absorbing means 20. When the maximum force is reached and the trigger mechanism is released, the load cell 17 may gauge or indicate the amount of force thereon; and the absorbing device 20 will then counteract the impact or mutative force component which would otherwise tend to disturb the maximum reading upon the gauge in the load cell 17 and thereby prevent inaccurate measurement of the release force.

Essentially the same manner of operation is provided in connection with a pull type tool which may be indicated in connection with FIGURE 2 by the impact mechanism 10' which has screw threads upon the shaft 19' for engaging the mating threads within the shaft 25 of impact absorbing means 20. In the case of the impacting tool rather than the pull tool the shaft 25 of the impact absorbing device 20 serves as an anvil for the hammer motion of the impact shaft 19 and need not contain the screw threads. Similarly on the opposite end of the impact absorbing mechanism 20, screw threads 26 are provided for receiving the shaft 18' of the test cell 17 so that the test cell 17 may register reaction and response to a pull from the pull mechanism shaft 19'. In this sort of operation the trigger mechanism releases the force after the pull exerted reaches a maximum pre-determined value and such discontinuity in the pull would tend similarly to disturb the maximum reading upon the gauge in test cell 17 without the intervention of the shock absorbing means 20.

The shock absorbing means 20 is cylindrical in form with a Teflon bushing 27 which serves to provide low friction axial slip of the impact mass 28. The triggered tool shaft coupled by way of the absorber shaft 25 then imparts any gradual force to the test cell shaft 18 by way of spring 29 either when being pushed or when being pulled against the test cell shaft. Because of extremely low frictional force occurring between the absorber mass 28 and the Teflon bushing 27, the error introduced in reading of any gauge attached to shaft 18 is negligible. However when the trip is released upon the tool the absorber works as mechanical filter which transmits the nearly statically applied trip force to the gauge but substantially completely absorbs the shock and vibration accompanying the impact provided when the trip is released.

The action of the absorber may be considered in connection with a tool which provides the shaft 19 as an impact hammer against the anvil 25 of the absorbing mechanism which is free to ride within the inner cylinder wall 30 of the absorber mass 28. At the moment of release of the trigger the shaft 19 would be propelled momentarily in the direction of the test cell shaft 18 and would tend to push the anvil 25 against spring 29 towards the mass 28. However, the shaft 19 is no longer held physically against the anvil by the drive since the trigger mechanism released the shaft 19 and therefore it is free to move in either axial direction. Thus the absorber spring 29 momentarily counteracts and absorbs the force produced by the released hammer mechanism 19 by pressing against the back wall of mass 28 and provides a corresponding movement of the shaft 19 in the opposite direction. Thus the anvil 25 and the hammer 19 may be considered two bodies moving toward each other and can be designed with momentums which cancel when they meet by proper choice of the spring 29 and the mass 28, so that very little of the shock resulting from release from the impact hammer 19 will be transmitted to the test cell shaft 18 and thereby to the gauge or load cell 17.

The motor control circuit in FIGURE 3 is coupled across line terminals 32, 33 to energize the motor 14 by operation of the relay 34 and its associated contact 34A. Initiation of the control cycle is accomplished by means of start switch 35 which closes its normally open contacts and energizes control relay 36 across the line to close its three contacts 36A, 36B and 36C. Three modes of operation are provided responsive to the setting of rotary switch contacts 38. In their shown position Rep. the switch 38 calls for a repeating test cycle, which may be halted by operation of the opening of stop button 39. This is accomplished by locking in energization of coil 36 by way of its holding contact 36A until the stop button 39 is released. In order to provide automatic cycling motion, the limit switches 40 and 41 are provided to sense the position of carriage 11 at two extreme positions. Contacts for these switches are shown in their normal positions intermediate the limits and their pairs of contacts will be changed as the carriage reaches limit and operates the switch. As the switches are shown the carriage is in an intermediate position; and the motor will run through contacts 36C and 34B to progress the carriage to the right. When the carriage reaches the right hand limit switch 40 and actuates it, relay 34 will be energized by way of the limit switch contact 40 and control contact 36B. This transfers the motor control to switch contact 34A which therefore moves the carriage to the left by reversing the motor drive as long as the relay is held in its closed position by its holding contact 34C. However as limit switch 41 at the left is encountered, the relay 34 is released and contact 34B therefore reverses the motor direction toward the right which action is continually repeated until the stop button 39 is actuated.

If, however, the rotary switch 38 is in the left limit position L and the start button 35 is energized, relay 36 is operated by way of contacts 36A through limit switch 41 until such time the left limit is reached and contact 41 is opened thereby releasing the control relay 36 and de-energizing the motor 14. Likewise if the rotary switch 38 is in its right limit position R and the start switch 35 is operated, relay 36 is energized moving motor 14 to the right until the right limit switch 40 opens to automatically stop the carriage as relay 36 is de-energized. Thus, the electrical control circuit provided for driving the motor driven power screw 13 comprises means for repetitively recycling the moving carriage 11 back and forth between two limiting positions in one mode of operation and comprises means for stopping the moving of the carriage at a limiting position at either the right or left end of travel through other modes of operation.

Figure 5:
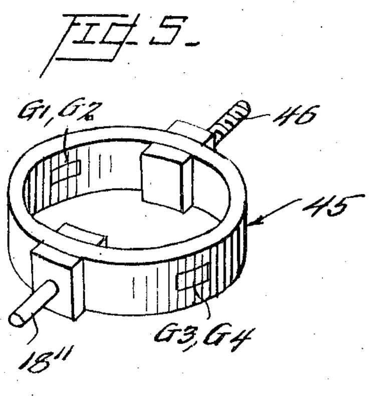
FIGURE 5 is a perspective view of a strain ring used in connection with gauge embodiment of FIGURE 4.

While the work test piece 17 may include any sort of a maximum recording mechanically deformable gauge such as spring operated gauge or the like, a more accurate gauge may be employed of the type shown in FIGURES 4 and 5. This gauge may be calibrated accurately enough to act as a standard for less expensive and routine mechanically operated gauges otherwise usable in the load cell 17.

Thus as shown in FIGURE 4, a Wheatstone bridge arrangement is employed with a meter gauge G responsive to the reaction provided in the various strain gauge sections G1 through G4.

As shown in FIGURE 5, the strain gauge sections G1 through G4 are employed in a strain ring 45 which is bolted to the load cell 17 by means of bolt 46 to provide the load cell shaft 18″. Thus any force either pushing or pulling upon shaft 18 will be reflected in the strain gauges G1 through G4 which will produce in a conventional manner a reading upon the meter G of the Wheatstone bridge in FIGURE 4.

It therefore has been shown by the foregoing detailed description of the invention and its various features that there is provided a testing device for determining the release force of a triggered mechanism which can provide accurate calibrated readings of the release force without significant error or interference induced from imposing a mutative force upon the workpiece or the guage shaft when the trigger mechanism is released.

Therefore having provided a new and improved test apparatus, those novel features believed descriptive of the scope and the nature of the invention are defined in particularity in the appended claims.

What is claimed is:

1. Test apparatus for determining the release force of a triggered mechanism which imposes a mutative force upon a workpiece comprising in combination, a mechanically deformable gauge for registering a maximum force encountered, means for gradually forcing said triggered mechanism against said gauge to deform said gauge, and impact absorbing means intermediate said mechanism and said gauge for filtering out the mutative change of force produced when said mechanism is triggered to thereby produce a maximum reading on said guage identifying the release force required to overcome the trigger mechanism without modification by the released mutative force.

2. Test apparatus as defined in claim 1 wherein the mechanism is an impact tool which is pushed against said gauge.

3. Test apparatus as defined in claim 1 wherein the mechanism is a pull tool which is coupled to pull said gauge.

4. Test apparatus as defined in claim 1 wherein the impact absorbing means comprises a low friction bushing enveloping an absorber mass for axial motion therein, and resilient means coupling said impact tool with said mass.

5. Test apparatus as defined in claim 1 wherein the means for gradually forcing the mechanism comprises a movable carriage coupled for movement by a motor driven power screw.

6. Test apparatus as defined in claim 5 wherein an electrical control circuit is provided for said motor driven power screw comprising means for stopping the movement of the carriage at a limiting position.

7. Test apparatus as defined in claim 5 wherein an electrical control circuit is provided for said motor driven power screw comprising means for repetitively recycling movement of said carriage back and forth between two limiting positions.

References Cited

UNITED STATES PATENTS

| | | | |
|---|---|---|---|
| 1,483,426 | 2/1924 | Fletcher | 177—186 |
| 2,003,360 | 6/1935 | Hansen | 177—186 |
| 2,035,729 | 3/1936 | Takahashi | 73—11 |
| 2,047,193 | 7/1936 | Currier | 73—11 |
| 3,176,508 | 4/1965 | Ward | 177—184 |
| 3,201,983 | 8/1965 | Herbert et al. | 73—141 |
| 3,246,510 | 4/1966 | Ruge | 73—141 |

FOREIGN PATENTS

| | | |
|---|---|---|
| 373,170 | 5/1932 | Great Britain. |

JAMES J. GILL, *Acting Primary Examiner.*

RICHARD C. QUEISSER, *Examiner.*

J. J. SMITH, *Assistant Examiner.*